(12) United States Patent
Stern

(10) Patent No.: US 7,725,396 B2
(45) Date of Patent: May 25, 2010

(54) SECURE KEYS FOR SOFTWARE ACTIVATION

(75) Inventor: Kevin L. Stern, Woodridge, IL (US)

(73) Assignee: Tellabs Operations, Inc., Naperville, IL (US)

( * ) Notice: Subject to any disclaimer, the term of this patent is extended or adjusted under 35 U.S.C. 154(b) by 351 days.

(21) Appl. No.: 11/407,540

(22) Filed: Apr. 19, 2006

(65) Prior Publication Data

US 2008/0040701 A1    Feb. 14, 2008

(51) Int. Cl.
*G06F 17/60* (2006.01)
(52) U.S. Cl. .............................. 705/50; 705/51; 705/52
(58) Field of Classification Search ................ 705/50, 705/51, 52
See application file for complete search history.

(56) References Cited

U.S. PATENT DOCUMENTS

| 5,398,285 | A | 3/1995 | Borgelt et al. |
| 6,557,105 | B1 | 4/2003 | Tardo et al. |
| 2005/0050315 | A1 | 3/2005 | Burkhardt et al. |
| 2005/0138387 | A1* | 6/2005 | Lam et al. ................... 713/185 |
| 2007/0041584 | A1* | 2/2007 | O'Connor et al. ............. 380/45 |

FOREIGN PATENT DOCUMENTS

JP     2008046854 A  *  2/2008

OTHER PUBLICATIONS

International Search Report and Written Opinion dated Oct. 12, 2007 in PCT/US2007/009350.

* cited by examiner

*Primary Examiner*—Pierre E Elisca
(74) *Attorney, Agent, or Firm*—Fitzpatrick, Cella, Harper & Scinto

(57) ABSTRACT

A secure method for generating and verifying keys to be utilized for software feature activation. The method includes secure key generation by a software manufacturer and secure key verification by the end software-product that reveals to the software which features to activate. This ensures that any key which activates a feature in the software is generated by the software manufacturer.

17 Claims, 10 Drawing Sheets

SECURE KEYS FOR SOFTWARE ACTIVATION

BACKGROUND OF THE INVENTION

1. Field of the Invention

The present invention relates generally to software activation and more specifically to secure generation and verification of keys for software feature activation.

2. Description of the Related Art

Large software applications typically include multiple features that may be activated individually. This allows a software application manufacturer to offer a customizable software application by activating selected groupings of features. One approach to selected feature activation includes the generation of keys by the software manufacturer that are created by applying a mathematical function to various customer defining data and activation data that identifies the feature or group of features to be activated. The customer then enters their data and the provided key to their copy of the software that verifies the key by applying this function to the customer-supplied data and comparing the result to the manufacturer-supplied key. Depending upon which feature data results in the manufacturer-supplied key, the software will know which feature to activate.

The inadequacy of current approaches is that it allows the possibility of a software hacker discovering the function used to generate a key and the feature-identification data since these pieces of information must be encoded in the software itself. With this information, the software hacker can easily generate their own key to activate software features without authorization.

Therefore, a need exists for a way to distribute software activation data securely. Secure keys for software activation in accordance with various aspects of the present invention meet such a need.

SUMMARY OF THE INVENTION

The present invention provides a secure method for generating and verifying keys to be utilized for software feature activation. The method includes secure key generation by a software manufacturer and secure key verification by the end software-product that reveals to the software which features to activate. This ensures that any key which activates a feature in the software is generated by the software manufacturer.

In one aspect of the invention, a method of processing an activation key for software is provided. The method includes providing an activation key for the software. An original message digest is generated using the activation key and a digest function and a digital signature is created by encrypting the original message digest using a private key of a private key and public key pair. The digital signature and the activation key are then distributed to a customer for use in activating the software.

In another aspect of the invention, a method of activating software is provided. The method includes validating an activation key using the activation key, a digital signature, a digest function and a public key of a public key and private key pair, wherein the digital signature is generated from the activation key using the digest function and private key of the public key and private key pair. The software is then activated when the activation key is validated.

In another aspect of the invention, validating the activation key includes decrypting the digital signature using the public key to reveal an original message digest and generating a comparison message digest using the activation key and the digest function. The activation key is validated when the comparison message digest and the revealed original message digest match.

In another aspect of the invention, the software is distributed in an inactivated state. The software includes a validator configured to validate an activation key using the activation key, a digital signature, a digest function and a public key of a public key private key pair, wherein the digital signature is generated from the activation key using the digest function and private key of the public key and private key pair. The software also includes an activator configured to activate the software when the activation key is validated.

BRIEF DESCRIPTION OF THE DRAWINGS

The present invention will be more readily understood from a detailed description of the preferred embodiment taken in conjunction with the following figures.

DETAILED DESCRIPTION

Figure 1:
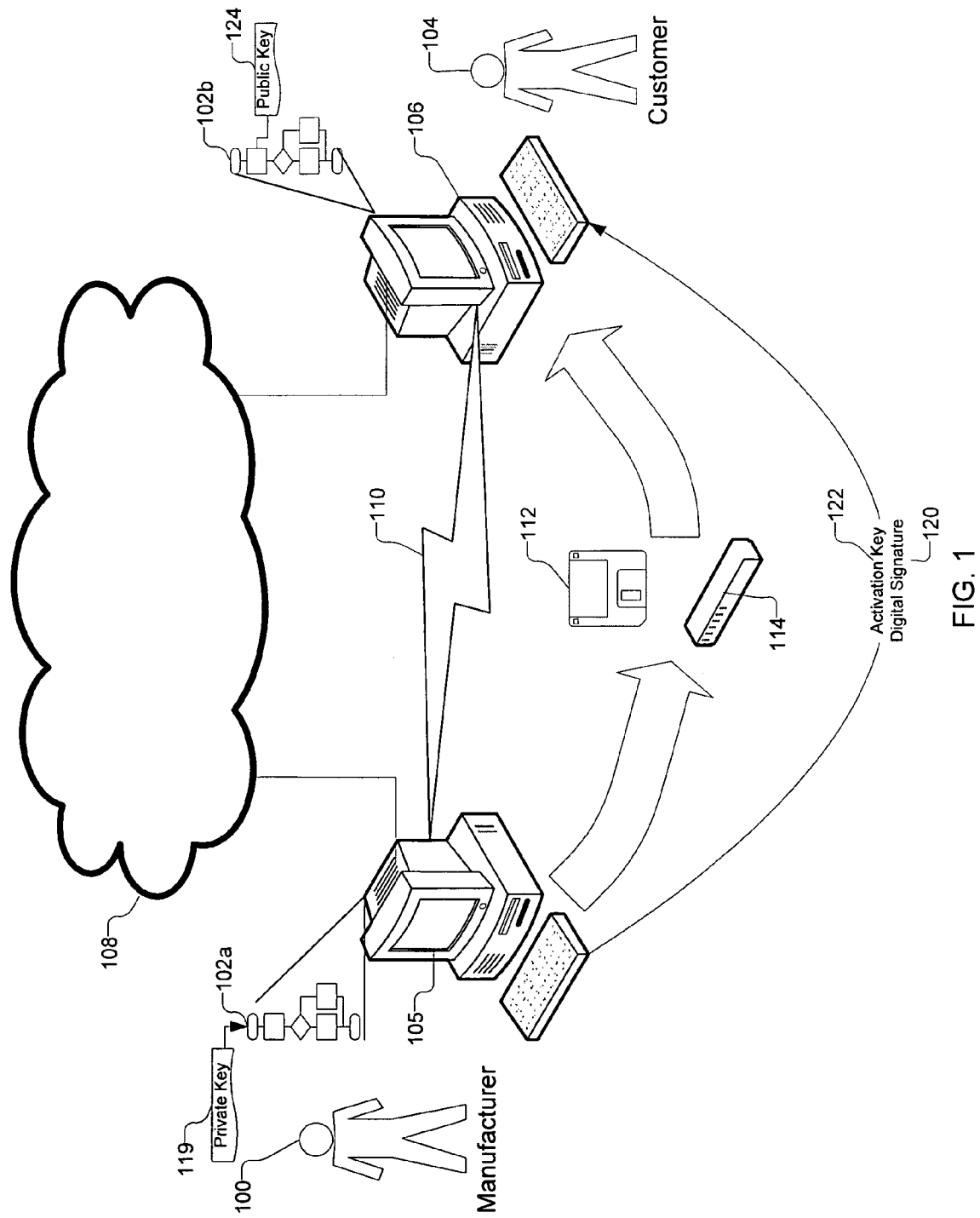
FIG. 1 is a schematic diagram of a system using secure keys for software activation in accordance with an exemplary embodiment of the present invention.

FIG. 1 is a schematic diagram of a system using secure keys for software activation in accordance with an exemplary embodiment of the present invention. A manufacturer 100, or any other entity distributing software, creates an inactivated version of the software 102a, for distribution to one or more customers, or any entity using the software, such as customer 104. To use the software 102a, the customer 104 obtains a copy of the inactivated software 102a and creates an activated version of the software 102b on a customer's computer system 106. The inactivated software 102a may be obtained by the customer 104 using a variety of methods. For example, the inactivated software 102a may be received by the customer from a manufacturer's computer system 105 via a communications or computer network such as a wired communications network 108 or a wireless communication network 110. The inactivated software 102a may also be delivered to the customer 104 via transportable memory media such as a disk 112 or a solid state memory device 114 or via other suitable means.

To enable the customer to activate the inactivated software 102a, the manufacturer uses a private key 119 of a private/public key pair to create a digital signature 120 of a software activation key 122. The digital signature 120 is verified by the inactivated software 102a using a public key 124 of the private/public key pair that is encoded within the inactivated software 102a before using the activation key 122 to enable specified features of the inactivated software 102a to become activated software 102b.

In the foregoing description, only a single manufacturer's computer system 105 and a single customer computer system 106 are discussed herein for the sake of convenience. However, it is to be understood that the manufacturer 100 can distribute software to a plurality of customers. Furthermore, it is to be understood that the customer 104 may receive inactivated software from a plurality of manufacturers. In addition, it is to be understood that software may be distributed for use or execution by any kind of data processing or computing device used by the customer, as exemplified by, but not limited to, mainframes, workstations, personal computers, personal digital assistants or other handheld computing devices.

Figure 2:
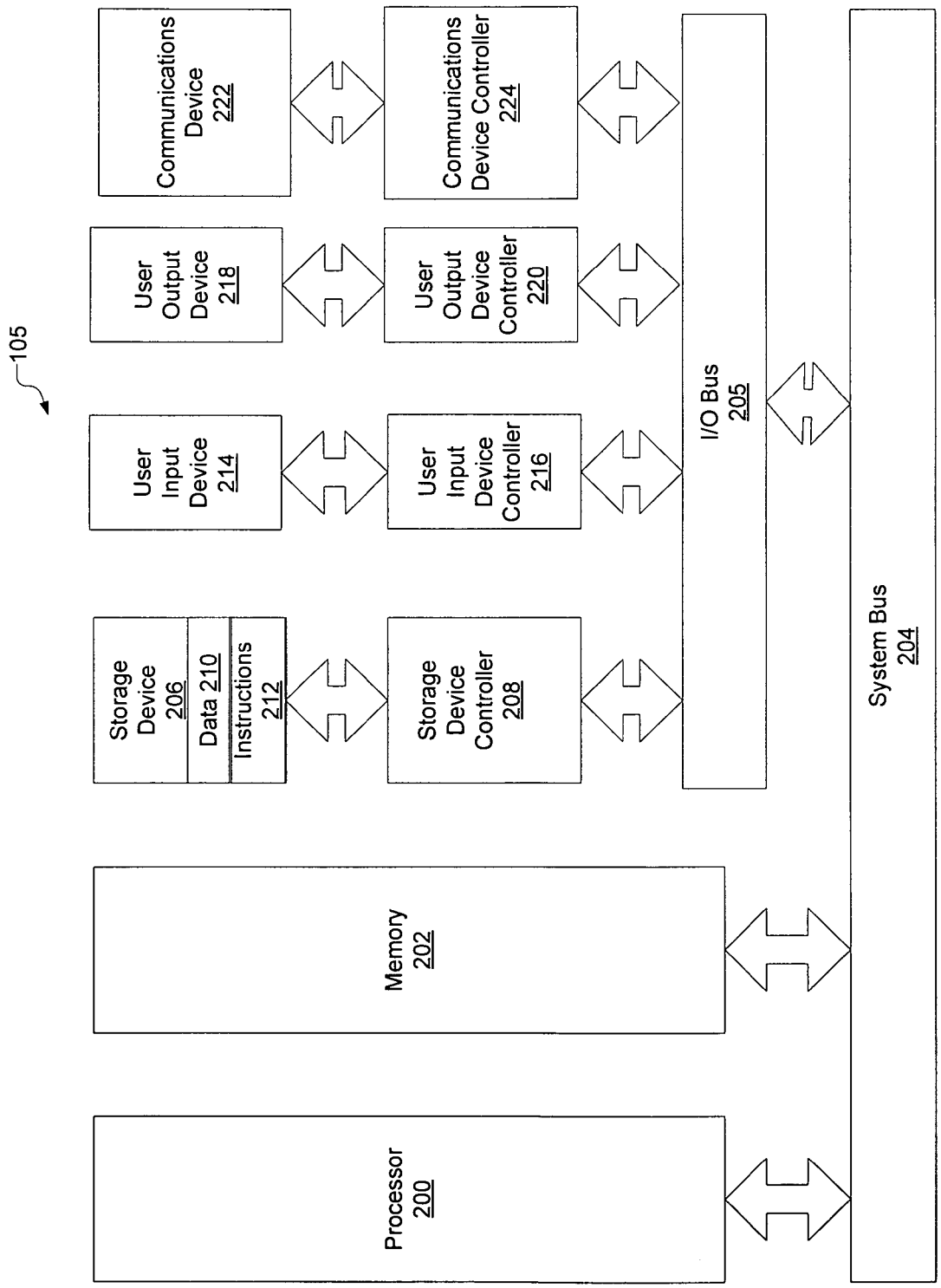
FIG. 2 is a block diagram of a manufacturer's computer system in accordance with an exemplary embodiment of the present invention.

Having described an overview of a system using secure keys for software activation, the manufacturer's computer system 105 and the customer computer system 106 will now be described in greater detail. FIG. 2 is a block diagram of a manufacturer's computer system 105 in accordance with an exemplary embodiment of the present invention. The manufacturer's computer system 105 may be used by the manufacturer 100 to create the inactivated software 102a and the activation key 122 and digital signature 120 for delivery to the customer 104 (all of FIG. 1). The manufacturer's computer system 105 includes a processor 200 coupled to a memory 202 via system bus 204. The processor 200 is also coupled to external Input/Output (I/O) devices (not shown) via the system bus 204 and an I/O bus 205. A storage device 206 having computer system readable media is coupled to the processor 200 via a storage device controller 208 and the I/O bus 205 and the system bus 204. The storage device 206 is used by the processor 200 to store and read data 210 and program instructions 212 used to implement the use of secure keys for software activation as described herein.

The processor 200 may be further coupled to an user input device 214 via an user input device controller 216 and the I/O bus 205 and the system bus 204. The processor 200 may also be further coupled to an user output device 218 via an user output device controller 220 and the I/O bus 205 and the system bus 204. A user, such as the manufacturer 100 (of FIG. 1) may use the user input device 214 to input data into the manufacturer's computer system 105. Exemplary user input devices include, but are not limited to, keyboards, key pads, touchscreens and various pointing devices. The manufacturer's computer system 105 may in turn, use the user output device 218 to output data to be used by the user. Exemplary user output devices include, but are not limited to, CRT, LCD, and plasma display monitors.

The processor 200 may be further coupled to a communications device 222 via a communications device controller 224 through the I/O bus 205 and the system bus 204. The manufacturer's computer system 105 may use the communications device 222 to communicate with an external computer system, such as the customer's computer system 106 (of FIG. 1) via the communication networks 108 and/or 110 (both of FIG. 1).

In operation, the processor 200 loads the program instructions 212 from the storage device 206 into the memory 202. The processor 200 executes the loaded program instructions 212 to implement the use of secure keys to activate software as described herein. In addition, the manufacturer's computer system 105 may use the storage device 206 to prepare the transportable memory media such as the disk 112 or the solid state memory device 114 for delivering the inactivated software 102a, the activation key 122 and the digital signature 120 to the customer's computer system 106 as illustrated in FIG. 1.

Figure 3:
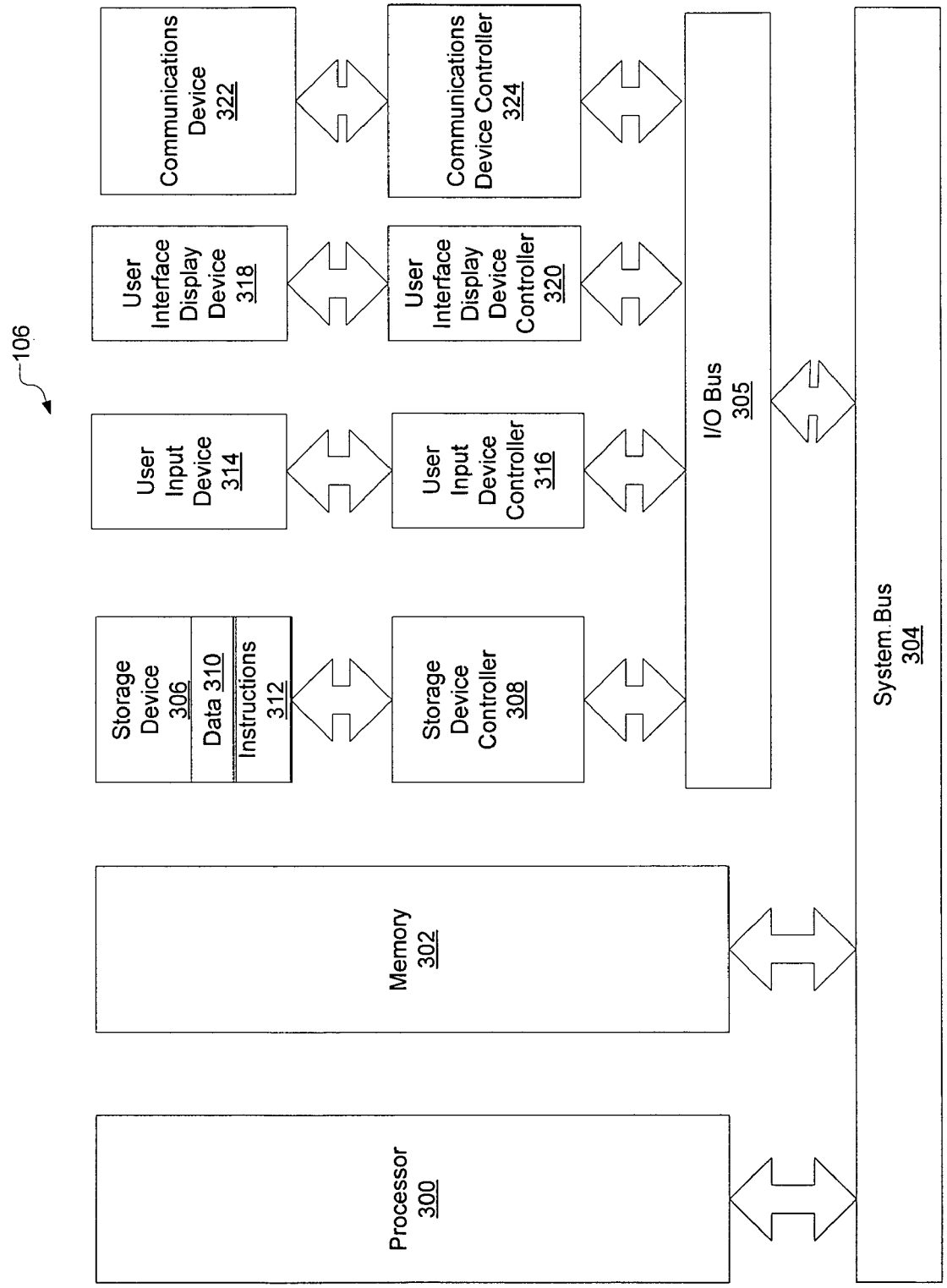
FIG. 3 is a block diagram of a customer's computer system in accordance with an exemplary embodiment of the present invention.

FIG. 3 is a block diagram of a customer's computer system 106 in accordance with an exemplary embodiment of the present invention. The customer's computer system 106 may be used by the customer 104 to create the activated software 102b using the activation key 122 and digital signature 120 delivered to the customer 104 by the manufacturer 100 (all of FIG. 1). The customer's computer system 106 includes a processor 300 coupled to a memory 302 via system bus 304. The processor 300 is also coupled to external Input/Output (I/O) devices (not shown) via the system bus 302 and an I/O bus 305. A storage device 306 having computer system readable media is coupled to the processor 300 via a storage device controller 308 and the I/O bus 305 and the system bus 304. The storage device is used by the processor 300 to store and read data 310 and program instructions 312 used to implement the use of secure keys for software activation as described herein.

The processor 300 may be further coupled to an user input device 314 via an user input device controller 316 and the I/O bus 305 and the system bus 304. The processor 300 may also be further coupled to an user output device 318 via an user output device controller 320 and the I/O bus 305 and the system bus 304. A user, such as the customer 104 (of FIG. 1) may use the user input device 314 to input data into the customer's computer system 106. Exemplary user input devices include, but are not limited to, keyboards, key pads, touchscreens and various pointing devices. The customer's computer system 106 may in turn, use the user output device 318 to output data to be used by the user. Exemplary user output devices include, but are not limited to, CRT, LCD, and plasma display monitors.

The processor 300 may be further coupled to a communications device 322 via a communications device controller 324 through the I/O bus 305 and the system bus 304. The customer's computer system 106 may use the communications device to communicate with an external computer system, such as the manufacturer's computer system 105 (of FIG. 1) via the communication networks 108 and/or 110 (both of FIG. 1).

In operation, the processor 300 loads the program instructions 312 from the storage device 306 into the memory 302. The processor 300 executes the loaded program instructions 312 to implement the use of secure keys to activate software as described herein. In addition, the customer's computer system 106 may use the storage device 306 to receive and read the transportable memory media such as the disk 112 or the solid state memory device 114 for reception of the inactivated software 102a, the activation key 122 or the digital signature 120 into the customer's computer system 106 as illustrated in FIG. 1.

The foregoing descriptions of the manufacturer's computer system 105 and the customer's computer system 106 are examples only as those skilled in the art will appreciate that any general purpose computing machine may be used to implement the use of secure keys to activate software as described herein. In addition, appropriately configured special purpose computing machines may be used as well.

Figure 4:
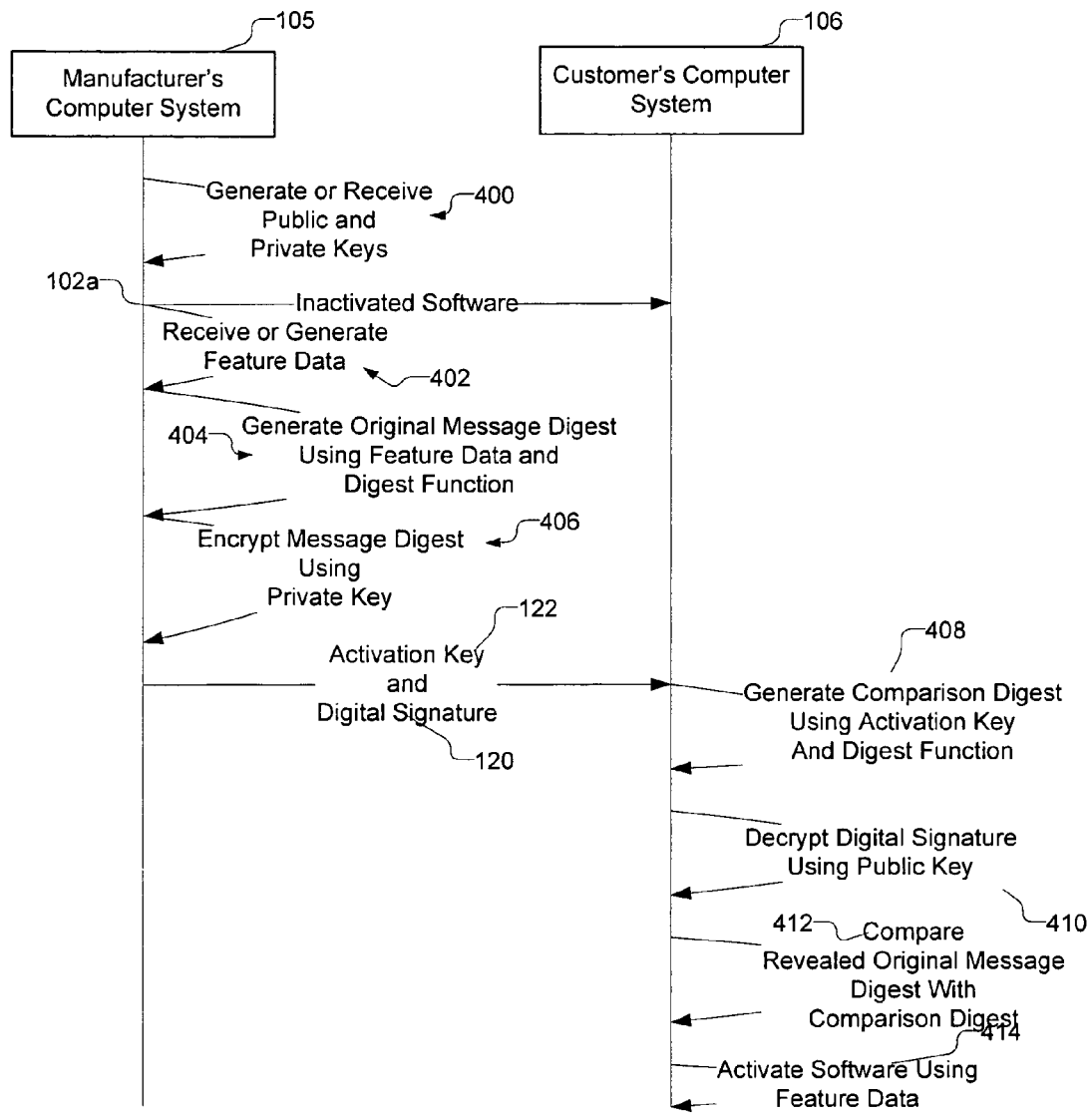
FIG. 4 is a sequence diagram of using secure keys for software activation in accordance with an exemplary embodiment of the present invention.

Having described an overview of a system using secure keys for software activation and described in detail the manufacturer's computer system 105 and the customer computer system 106, a sequence of operations and related functional modules and processes will now be described in greater detail. FIG. 4 is a sequence diagram of using secure keys for software activation in accordance with an exemplary embodiment of the present invention. The manufacturer 100 (of FIG. 1) uses the manufacturer's computer system 105 to generate or receive (400) a private/public key pair. The public key along with a digest function used to generate a message digest is included in the inactivated software 102a that is delivered to the customer's computer system 106 in the above described manner.

The manufacturer's computer system 105 is provided, receives or generates (402) feature data that may be used to enable features within the inactivated software 102a. The manufacturer's computer system 105 generates (404) an original message digest from the feature data using the same digest function included in the inactivated software 102a. The manufacturer's computer system 105 generates (406) the digital signature 120 by encrypting the original message digest using the private key. The feature data is included in the activation key 122 that is delivered to the customer's computer system 106 along with the digital signature 120.

Once the customer's computer system 106 receives the activation key 122 and digital signature 120, the customer's computer system 106 may use the digital signature 120 to validate the feature data included in the activation key 122. To do so, the customer's computer system generates (408) a comparison digest using the activation key and the digest function included in the inactivated software 102a. In addition, the customer's computer system 106 decrypts (410) the digital signature 120 using the public key 124 included in the inactivated software 102a to reveal the original message digest generated by the manufacturer's computer system 105. To validate the activation key, the customer's computer system 106 compares (412) the decrypted original message digest with the comparison digest. If they are comparable, the customer's computer system 106 activates (414) the inactivated software 102a using the feature data from the activation key 122.

Figure 5:
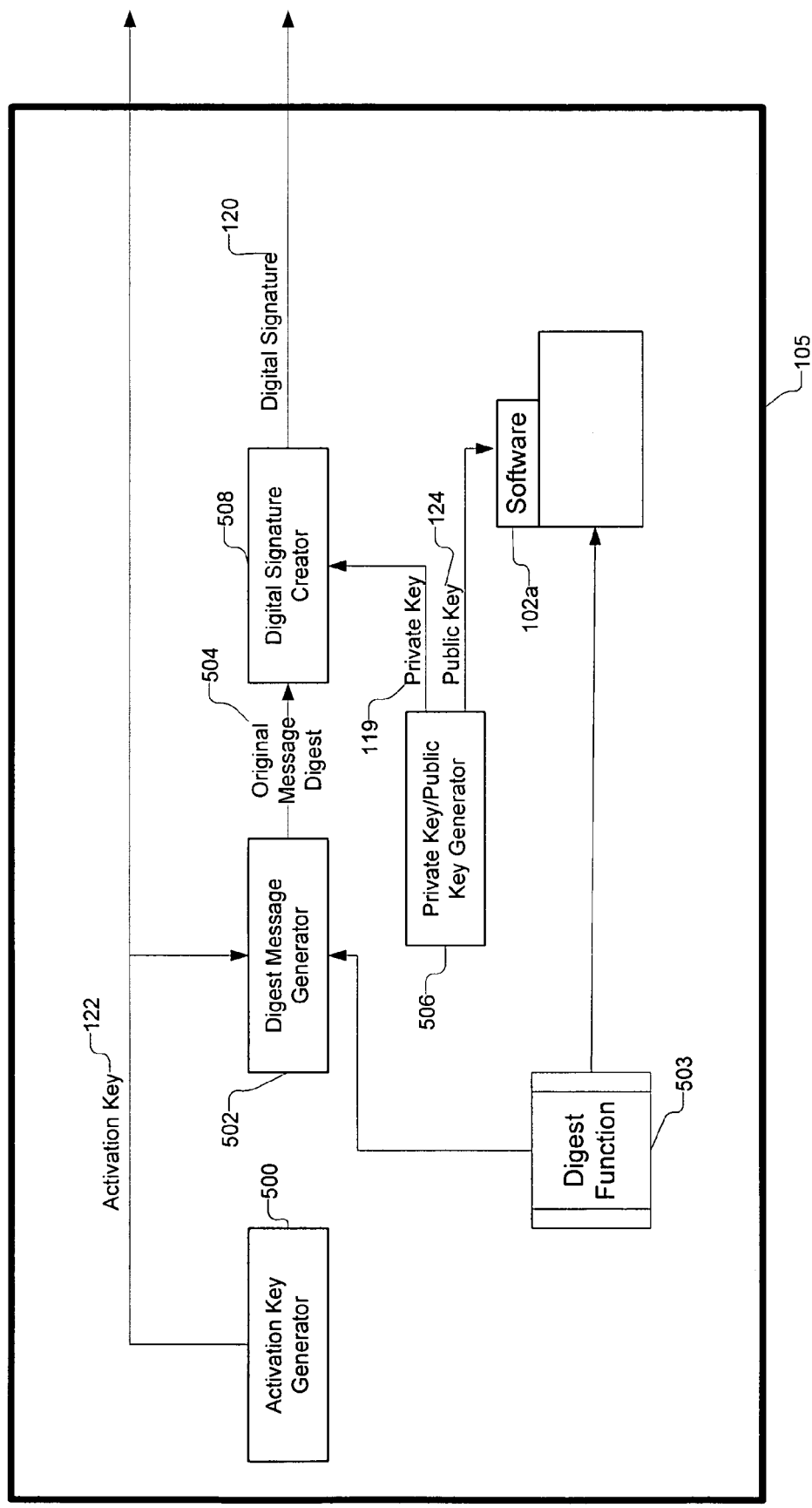
FIG. 5 is a collaboration diagram for functional modules deployed on a manufacturers's computer system for processing an activation key in accordance with an exemplary embodiment of the present invention.

Having described the sequence of operations within a system using secure keys for software activation, specific functional modules implementing the operations will now be described. FIG. 5 is a collaboration diagram for functional modules deployed on a manufacturers's computer system 105 for processing an activation key in accordance with an exemplary embodiment of the present invention. The functional modules include an activation key generator 500, a digest message generator 502, a private key/public key generator 506 and a digital signature generator 508. The functional modules may be implemented on the manufacturer's computer system 105 as software modules or objects. In other embodiments, the functional modules may be implemented using hardware modules or other types of circuitry, or a combination of software and hardware modules.

In operation, the activation key generator 500 generates the activation key 122 that will be distributed to the customer 104 (of FIG. 1) for activating the inactivated software 102a. The digest message generator 502 uses a digest function 503 to generate an original message digest 504 from the activation key 122. By way of illustration and not as a limitation, the digest function 503 can be a hash function. A hash function takes a long message of any length as input and produces a fixed length string as the original message digest 504. Many suitable hash functions are well known in the art. Suitable hash functions include, but are not limited to: HAVAL, MD2, MD4, MD5, RIPEMD-128, RIPEMD-160, SHA-0, SHA-1, SHA-224, SHA-256, SHA-384, SHA-512, Snefru, Tiger-160 and Tiger-160.

The private key/public key generator 506 is used to generate the paired private key 119 and public key 124. Public key encryption systems using private key and public key pairs are well known in the art. Suitable public key techniques include, but are not limited to, Diffie-Hellman, DSS (Digital Signature Standard), ElGamal, CAPI, Elliptic Curve techniques, Paillier cryptosystem and the RSA encryption algorithm (PKCS).

By way of example of key generation and not as a limitation, the key generation algorithm for the RSA encryption algorithm will now be described. The RSA key generation algorithm includes determining two large random primes, p and q, of approximately equal size such that their product or modulus, n=pq, is of a size greater than that of the message digest. Next, the totient, $\phi=(p-1)(q-1)$, is computed. An integer, e, is then chosen such that $1<e<\phi$ and e and $\phi$ are coprimes. The secret exponent, d, is computed such that $1<d<\phi$ and ed≡1(mod $\phi$). The public key is composed of n and e and the private key is composed of n and d. The values of p, q, and $\phi$ are also kept secret.

The digital signature creator 508 uses the private key 119 to create the digital signature 120 by encrypting the original message digest 504. In addition, the public key 124 is included in the inactivated software 102a along with the digest function 503 for later use in validating the activation key 122. Once the digital signature 120 is created using the private key 119 and the original message digest 504, the digital signature 120 may be distributed with the activation key 122 for use by the customer 104 (of FIG. 1) in activating the inactivated software 102a.

Figure 6:
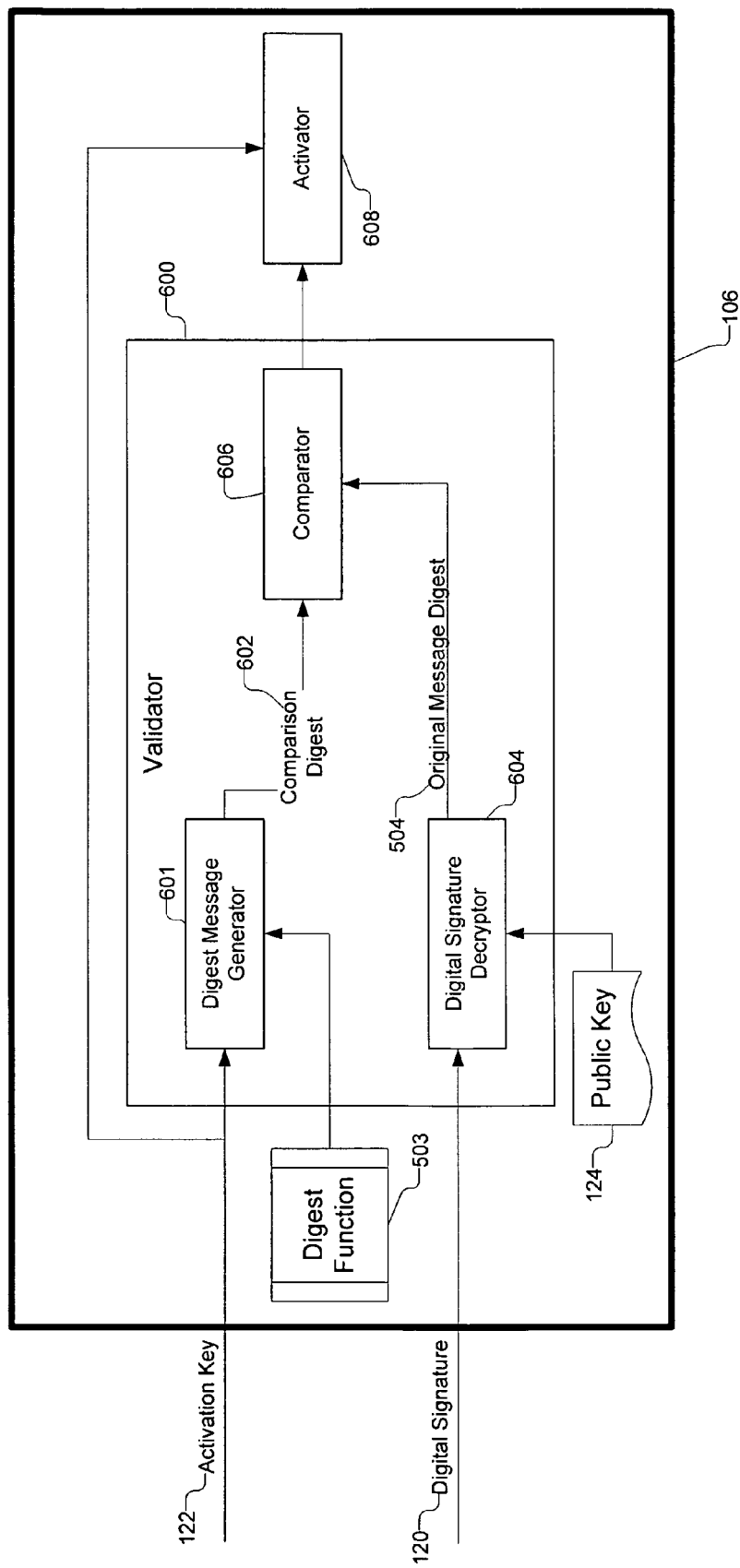
FIG. 6 is a collaboration diagram for functional modules deployed on a customer computer system for activating software in accordance with an exemplary embodiment of the present invention.

FIG. 6 is a collaboration diagram for functional modules deployed on the customer computer system 106 for activating the inactivated software 102a (of FIG. 1) in accordance with an exemplary embodiment of the present invention. The functional modules include a validator 600 and an activator 608. The functional modules may be implemented on the customer computer system 106 as software modules or objects. In other embodiments, the functional modules may be implemented using hardcoded computational modules or other types of circuitry, or a combination of software and circuitry modules.

In operation, the validator 600 obtains the activation key 122 and the digital signature 120 to be used to validate the activation key 122. The validator 600 includes a digest message generator 601 that uses the digest function 503 to generate a comparison digest 602 from the activation key 122. The validator 600 also includes a digital signature decryptor 604 that uses the public key 124 to decrypt the digital signature 120 to reveal the original message digest 504. A comparator 606 compares the comparison digest 602 and the original message digest 504 to determine if the comparison digest 602 and the original message digest 504 match. If they do match, the validator 600 validates the activation key 122 that is then used by the activator 608 to activate the inactivated software 102a (of FIG. 1).

Figure 7:
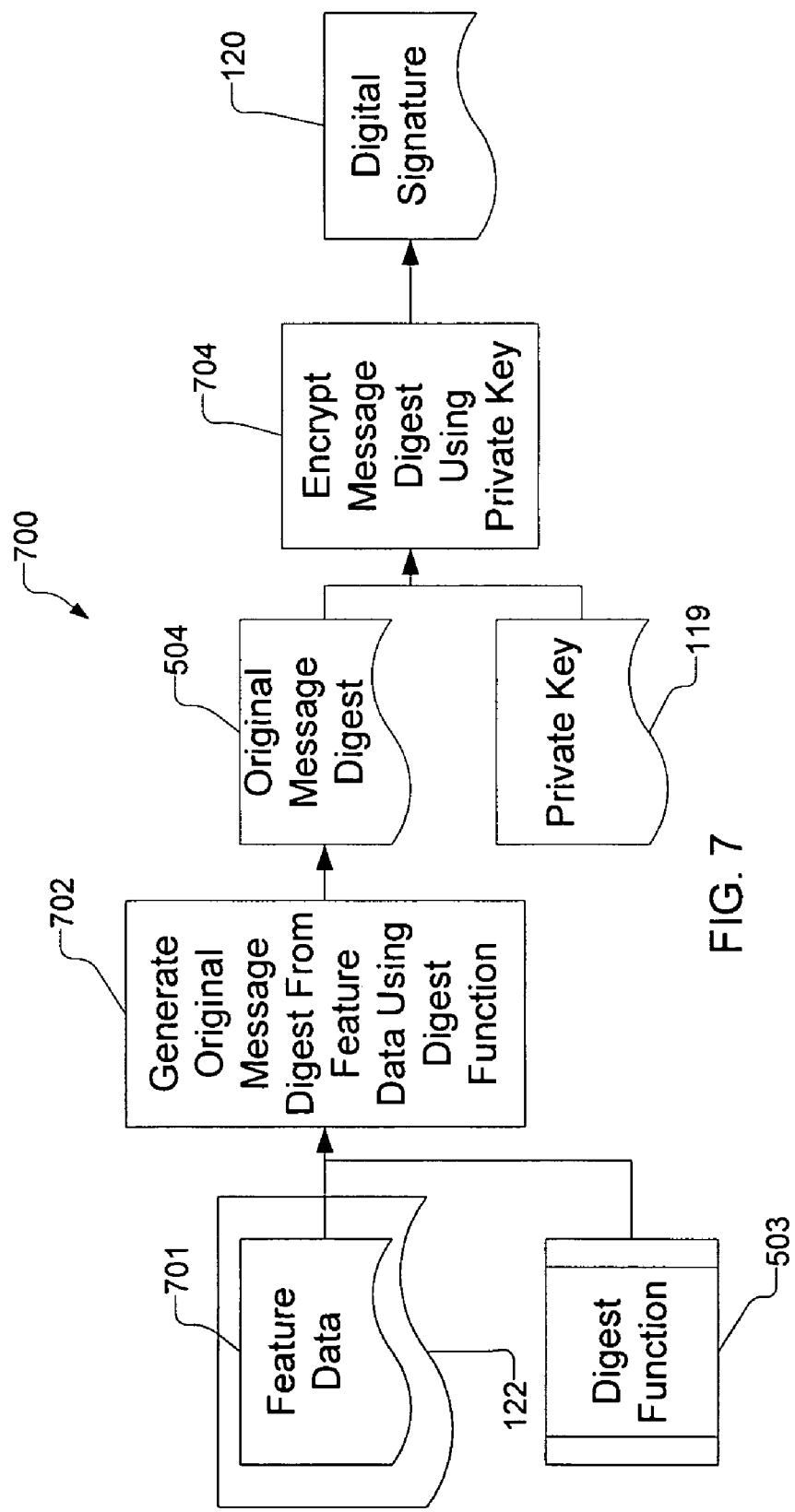
FIG. 7 is a process flow diagram of a digital signature generation process for generating a digital signature for an activation key in accordance with an exemplary embodiment of the present invention.

Having described the collaboration of the functional modules, the processes used in the functional modules will now be described in greater detail. FIG. 7 is a process flow diagram of a digital signature generation process for generating a digital signature using feature data in accordance with an exemplary embodiment of the present invention. A digital signature generation process 700 is implemented on the manufacturer's computer system 105 (of FIG. 1) and used to generate the digital signature 120 for distribution with the activation key 122. To generate the digital signature 120, feature data 701, included in the activation key 122 and specifying which features of the inactivated software 102*a* (of FIG. 1) to enable, is used to generate (702) the original message digest 504 using the digest function 503. The original message digest 504 is then encrypted (704) using the private key 119 of the private/public key pair to create the digital signature 120.

The format and amount of the feature data 701 included in the activation key 122 are arbitrary. By way of example and not of limitation, a bit sequence may be used as the format for the feature data 701 where each bit corresponds to a particular software feature. In this example, if the value of a bit corresponding to a feature is "1" then the feature is activated and otherwise the feature is not activated. So long as each entity handling the bit sequence knows that the least significant bit corresponds to a feature, for example feature "A", and the next bit corresponds to a feature "B", then the exemplary bit sequence provides a compact format for the feature data 701. As a further example, feature data 701 consisting of the bit sequence "00" would correspond to no features being activated, feature data 701 consisting of "01" would correspond to feature A being activated but not B, and feature data 701 consisting of "10" would correspond to feature B being activated but not A, and "11" would correspond to both features A and B being activated.

As another example, the feature data 701 could be stored in XML format, such as:

```
<Feature Activation Data>
    <Feature>
        <Name>A</Name>
        <Activate>Yes</Activate>
    </Feature>
    <Feature>
        <Name>B</Name>
        <Activate>No</Activate>
    </Feature>
</Feature Activation Data>
```

As yet another example of how arbitrary the data encoding scheme can be, the feature data 701 could include the string "jf9s87f*&@#" corresponding to a meaning "activate feature A", or the string "jS(S*DFUY" corresponding to the meaning "activate feature B", or the string "&*DSDS&*SD" corresponding to the meaning "activate both feature A and feature B", or the string "BSDUI^&D" corresponding to the meaning "activate neither feature A nor feature B."

Figure 8:
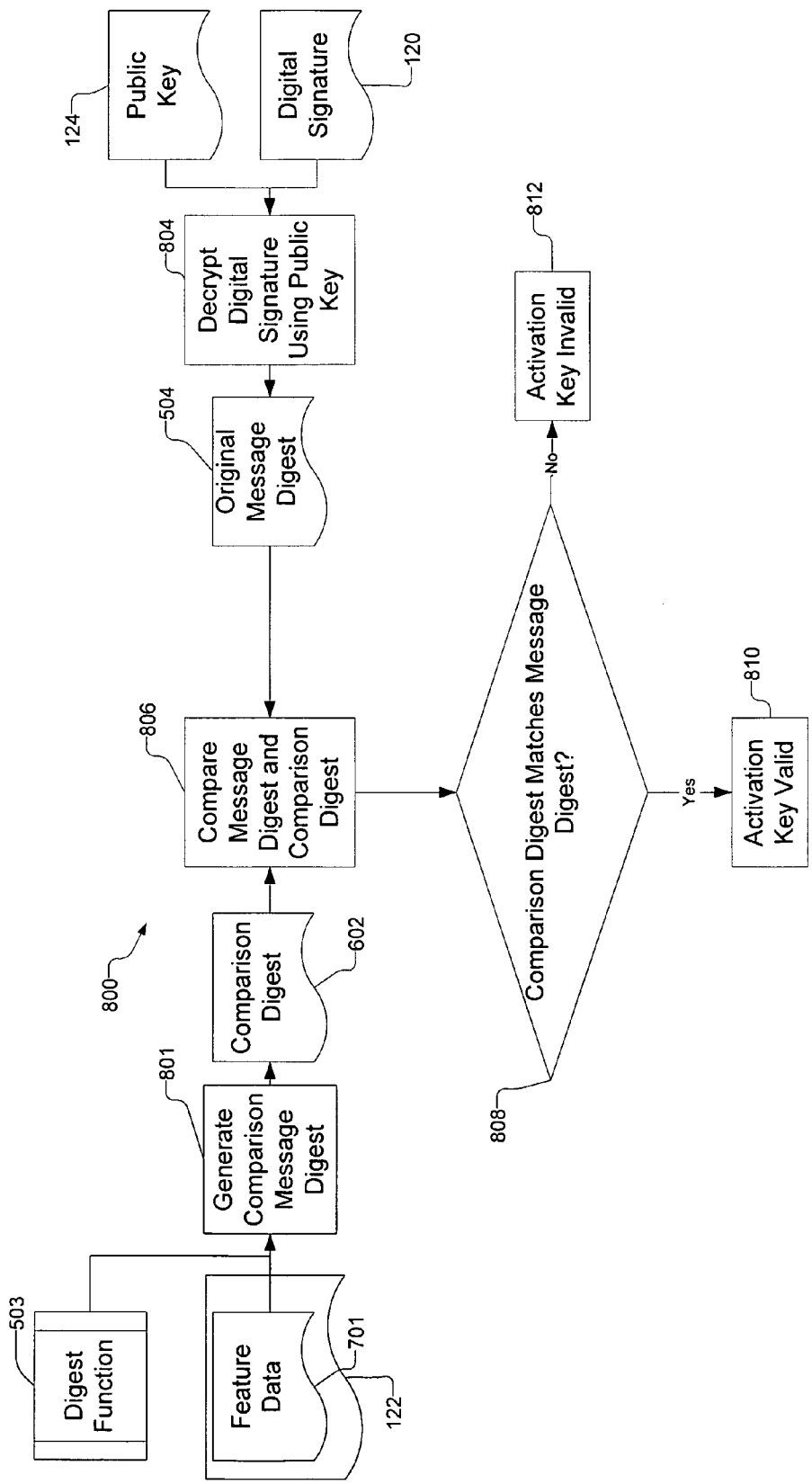
FIG. 8 is a process flow diagram of a validation process that uses a digital signature to validate an activation key having feature data in accordance with an exemplary embodiment of the present invention.

FIG. 8 is a process flow diagram of a validation process that uses the digital signature 120 to validate the activation key 122 having feature data 701 in accordance with an exemplary embodiment of the present invention. A validation process 800 is implemented on the customer's computer system 106 (of FIG. 1) and used to validate the feature data 701 included in the activation key 122. In the validation process 800, the digest function 503 is used along with the feature data 701 from the activation key 122 to generate (801) a comparison digest 602. The validation process 800 uses the public key 124 to decrypt (804) the digital signature 120 to reveal the original message digest 504 that was generated by the manufacturer's computer system 105 (of FIG. 1). The validation process 800 then compares (806) the original message digest 504 and the comparison digest 602. If the original message digest 504 and the comparison digest 602 are determined to be comparable because, for example, they match (808), the activation key 122 is determined to be valid (810). However, if the comparison digest 602 does not match the original message digest 504, the activation key 122 is determined to be invalid (812).

Figure 9:
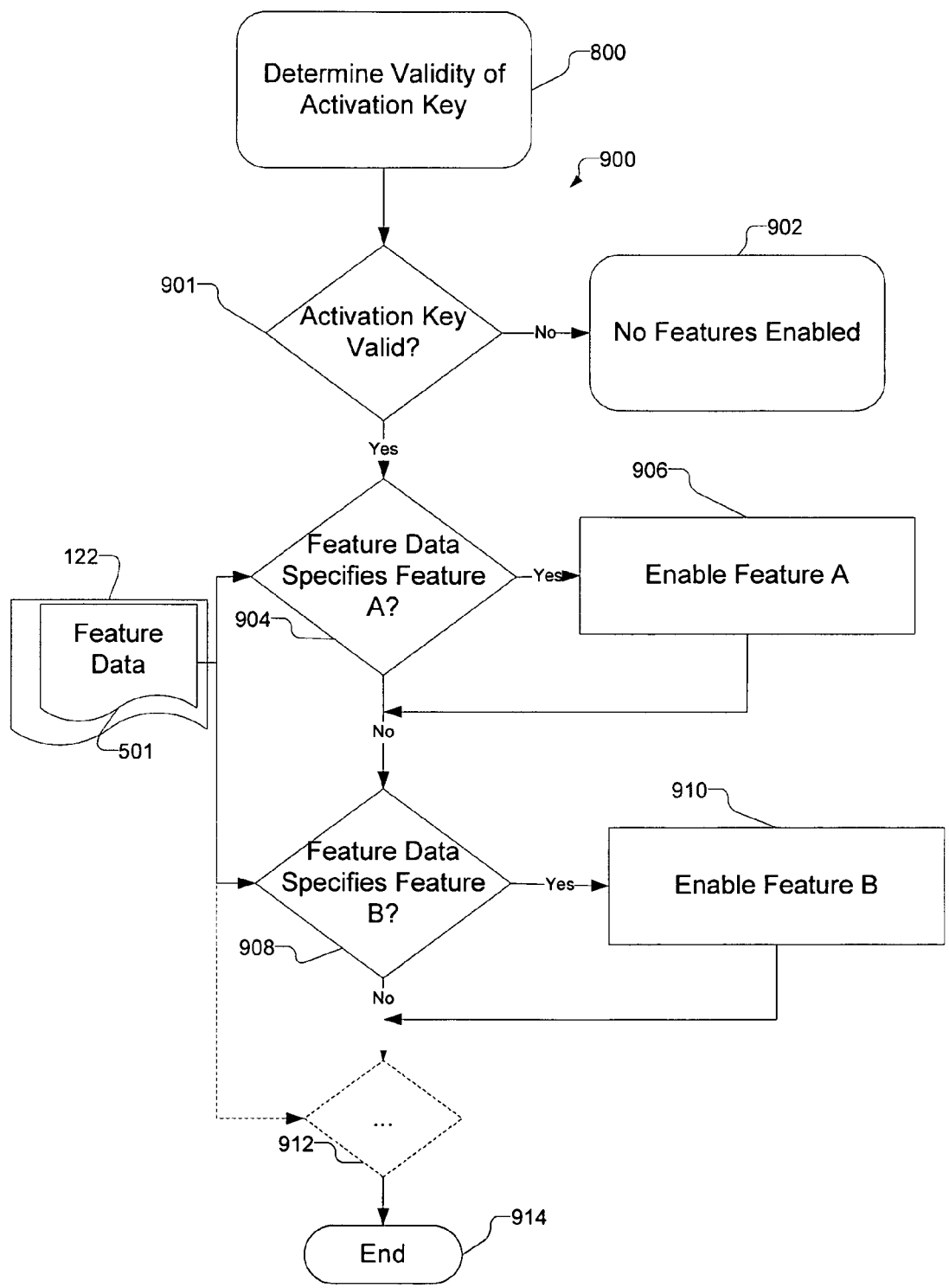
FIG. 9 is a process flow diagram of a software feature enabling process used to enable software features using feature data from an activation key in accordance with an exemplary embodiment of the present invention.

FIG. 9 is a process flow diagram of a software feature enabling process used to enable software features using the feature data 701 from the activation key 122 in accordance with an exemplary embodiment of the present invention. A software feature enabling process 900 is used by the customer's computer system 106 to generate the activated software 102*b* from the inactivated software 102*a* distributed by the manufacturer 100 (all of FIG. 1). The validity of the activation key 122 is first determined using the previously described validation process 800. If the validation process 800 determines (901) that the activation key 122 is not valid, no features are enabled (902). However, if the activation key is determined (901) to be valid, the feature data 701 included in the activation key 122 is examined (904) to determine if a feature, such as feature "A", is specified for enablement. If so, the feature is enabled (906). If not, the feature is not enabled, and the software feature enabling process 900 continues processing the feature data 701 without enabling the feature. In a likewise manner, the feature data 701 is examined (908) to determine if another feature, such as a feature "B", is specified for enablement. If so, the other feature is enabled (910), If not, the feature is not enabled and the software feature enabling process 900 continues processing the feature data 701. The process of determining if feature data 701 includes a specification for enabling features may be repeated (912) for an indefinite number of features until the end (914) of the feature data 701 is reached.

Figure 10:
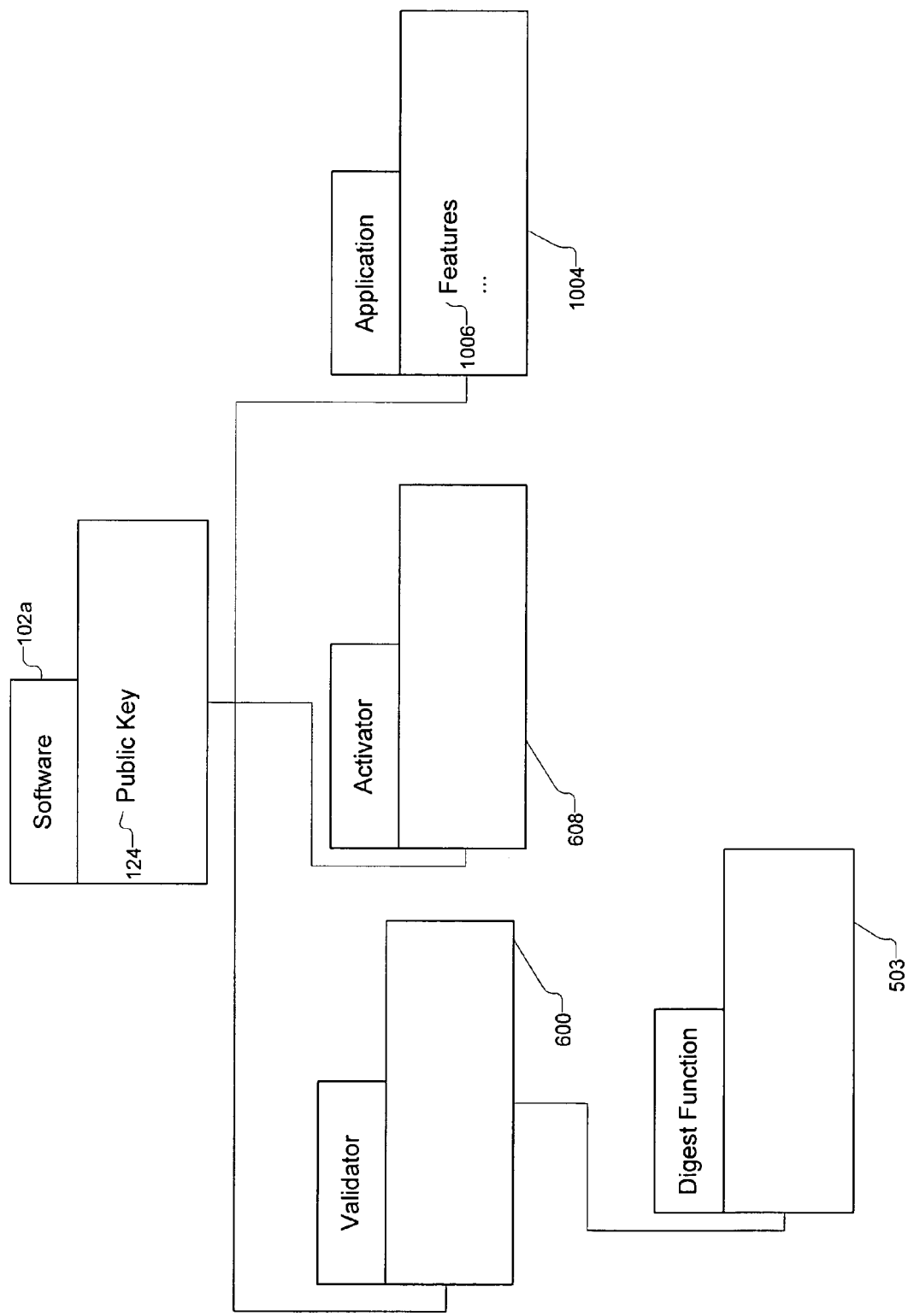
FIG. 10 is a package diagram for software using secure keys for software activation in accordance with an exemplary embodiment of the present invention.

FIG. 10 is a package diagram for software using secure keys for software activation in accordance with an exemplary embodiment of the present invention. The software is distributed in an inactivated form as inactivated software 102*a* as previously described. The inactivated software 102*a* includes the public key 124 used to decrypt the digital signature 120 distributed with the activation key 122 (both of FIG. 1). The inactivated software 102*a* further includes the validator 600 that implements the validation process 800 (of FIG. 8). The validator 600 includes the digest function 503 (of FIG. 5) used to both generate the message digest 504 (of FIG. 5) and the comparison digest 602 (of FIG. 6). The inactivated software 102*a* further includes the activator 608 that performs the software feature enabling process 900 (of FIG. 9). The inactivated software 102*a* further includes a software application 1004 having features 1006 that may be enabled using the feature data 701 (of FIG. 7) and distributed in the activation key 122 (of FIG. 1).

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supportable by this application and the claims' equivalents rather than the foregoing description.

What is claimed is:

1. A method of processing an activation key for software, comprising:
   providing an activation key for the software; and
   performing by a processor the following:

generating an original message digest using the activation key and a digest function; and creating a digital signature by encrypting the original message digest using a private key of a private key and public key pair, the digital signature and the activation key for distribution to a customer for use in activating the software using the activation key, the digital signature, the digest function and the public key by decrypting the digital signature using the public key to reveal an original message digest, generating a comparison message digest using the activation key and the digest function and validating the activation key when the comparison message digest and the revealed original message digest match.

2. The method of claim 1, wherein the digest function is a hash function.

3. The method of claim 1, wherein the original message digest is generated using feature data included in the activation key, the feature data for enabling at least one specified feature of the software.

4. The method of claim 1, further comprising including in the software the digest function and a public key of the private key and public key pair.

5. A system for processing an activation key and for activating software using the activation key, comprising:

an activation key generator that generates an activation key for the software;

a digest message generator that generates an original message digest using the activation key and a digest function;

a digital signature creator that creates a digital signature by encrypting the original message digest using a private key of a private key and public key pair, the digital signature and the activation key for distribution to a customer for use in activating the software using the activation key, the digital signature, the digest function and the public key;

a decryptor constructed to decrypt the digital signature using the public key to reveal an original message digest;

a message digest generator constructed to generate a comparison message digest using the activation key and the digest function;

a comparator constructed to validate the activation key when the comparison message digest and the revealed original message digest match; and an activator constructed to activate the software when the activation key is validated.

6. The system of claim 5, wherein the digest function is a hash function.

7. The system of claim 5, wherein the digest message generator generates the original message digest using feature data included in the activation key, the feature data for enabling at least one specified feature of the software.

8. The system of claim 5, wherein the digest function and a public key of the private key and public key pair are included in the software.

9. A method of activating software, comprising:
performing by a processor the following:
validating an activation key using the activation key, a digital signature, a digest function and a public key of a public key and private key pair, wherein the digital signature is generated from the activation key using the digest function and private key of the public key and private key pair; and activating the software when the activation key is validated, wherein validating the activation key comprises:

decrypting the digital signature using the public key to reveal an original message digest;

generating a comparison message digest using the activation key and the digest function; and validating the activation key when the comparison message digest and the revealed original message digest match.

10. The method of claim 9, wherein the digest function is a hash function.

11. The method of claim 9, wherein the activation key includes feature data and the software is activated in the activating by using the feature data.

12. An apparatus for activating software, comprising:

a validator constructed to validate an activation key using the activation key, a digital signature, a digest function and a public key of a public key private key pair, wherein the digital signature is generated from the activation key using the digest function and private key of the public key and private key pair, the validator comprising:

a decryptor constructed to decrypt the digital signature using the public key to reveal an original message digest;

a message digest generator constructed to generate a comparison message digest using the activation key and the digest function; and a comparator constructed to validate the activation key when the comparison message digest and the revealed original message digest match; and an activator constructed to activate the software when the activation key is validated.

13. The apparatus of claim 12, wherein the digest function is a hash function.

14. The apparatus of claim 12, wherein the activation key includes feature data and the activator uses the feature data to activate the software.

15. A computer-readable storage medium storing computer-executable software, the software comprising:

a validator module that validates an activation key using the activation key, a digital signature, a digest function and a public key of a public key private key pair, wherein the digital signature is generated from the activation key using the digest function and private key of the public key and private key pair; and an activator module that activates the software when the activation key is validated, wherein the validator module further comprises:

a decryptor that decrypts the digital signature using the public key to reveal an original message digest;

a message digest generator that generates a comparison message digest using the activation key and the digest function; and a comparator that validates the activation key when the comparison message digest and the revealed original message digest match.

16. The computer-readable storage medium of claim 15, wherein the digest function is a hash function.

17. The computer-readable storage medium of claim 15, wherein the activation key includes feature data and the activator in the activating uses the feature data to activate the software.

* * * * *